United States Patent
Palkic et al.

(10) Patent No.: US 11,644,131 B1
(45) Date of Patent: May 9, 2023

(54) PUMP ADAPTER

(71) Applicant: Holley Performance Products, Inc., Bowling Green, KY (US)

(72) Inventors: Darko Palkic, Bowling Green, KY (US); Timothy A. Grillot, Alvaton, KY (US)

(73) Assignee: Holley Performance Products, Inc., Bowling Green, KY (US)

( * ) Notice: Subject to any disclaimer, the term of this patent is extended or adjusted under 35 U.S.C. 154(b) by 56 days.

(21) Appl. No.: 16/553,619

(22) Filed: Aug. 28, 2019

Related U.S. Application Data

(60) Provisional application No. 62/727,716, filed on Sep. 6, 2018.

(51) Int. Cl.
| | |
|---|---|
| *F16L 21/06* | (2006.01) |
| *F16L 21/00* | (2006.01) |
| *F04B 53/16* | (2006.01) |
| *F04B 53/22* | (2006.01) |

(52) U.S. Cl.
CPC ............ *F16L 21/065* (2013.01); *F04B 53/16* (2013.01); *F16L 21/002* (2013.01); *F04B 53/22* (2013.01)

(58) Field of Classification Search
CPC ......... F04B 53/22; F04B 53/16; F16L 21/065; F16L 37/05; F16L 25/14; F16L 5/027
USPC .......................................................... 417/360
See application file for complete search history.

(56) References Cited

U.S. PATENT DOCUMENTS

| | | | | |
|---|---|---|---|---|
| 4,569,637 A | * | 2/1986 | Tuckey .................. | F02M 37/08 417/435 |
| 5,165,867 A | * | 11/1992 | Dockery ............... | F02M 37/103 417/360 |
| 5,482,444 A | * | 1/1996 | Coha .................... | F02M 37/103 248/638 |
| 5,498,042 A | * | 3/1996 | Dole ...................... | F16L 37/148 285/148.27 |
| 6,558,124 B2 | * | 5/2003 | Bucher ................. | F04D 25/088 417/423.15 |

(Continued)

FOREIGN PATENT DOCUMENTS

| | | |
|---|---|---|
| AU | 201910220 | 3/2019 |
| AU | 201911579 | 4/2019 |
| AU | 201911581 | 4/2019 |

OTHER PUBLICATIONS

Design U.S. Appl. No. 29/597,917 entitled "Adapter" filed Mar. 21, 2017.

(Continued)

*Primary Examiner* — Philip E Stimpert
(74) *Attorney, Agent, or Firm* — Dinsmore & Shohl LLP

(57) ABSTRACT

The present embodiments provide an adapter which may be utilized with traditional in-tank fuel pumps to convert the pump from a first style to a second, alternative style. The instant embodiment utilizes an adapter which slides on the end of an existing fuel pump type and provides indexing for proper alignment and fuel communication. The adapter also allows connection of alternate type of port or fitting in order to allow connection with more desirable type of fuel pickup system. The adapter is then clamped onto the end of the pump once the adapter and pump are indexed to proper alignment for sealing and fuel communication. The adapter may also include a coupling for a fitting to connect additional fuel delivery and/or filtration parts to the pump.

12 Claims, 12 Drawing Sheets

(56) References Cited

U.S. PATENT DOCUMENTS

| | | | |
|---|---|---|---|
| 7,533,661 B2 | 5/2009 | Baasch | |
| 2007/0025866 A1* | 2/2007 | Douyama | F04B 53/22 |
| | | | 417/423.3 |
| 2007/0102060 A1* | 5/2007 | Palmer | F04B 53/16 |
| | | | 141/231 |
| 2016/0003475 A1* | 1/2016 | Pestoor | F16L 25/14 |
| | | | 126/317 |

OTHER PUBLICATIONS

U.S. Appl. No. 62/727,716 entitled "Pump Adapter" filed Sep. 6, 2018.
Design U.S. Appl. No. 29/658,294 entitled "Adapter" filed Jul. 30, 2018.
Design U.S. Appl. No. 29/662,532 entitled "Pump Adapter" filed Sep. 6, 2018.
U.S. Appl. No. 62/872,520 entitled "Air Filter Adapter" filed Jul. 10, 2019.
Radium Engineering, 20-0145 Fuel Pump Inlet Adapter Installation Instructions, Sep. 21, 2018 [publication date retrieved from Internet Wayback Machine on Oct. 8, 2019].
www.efihardware.com, Walbro in Tank Fuel Pump Extension Kit, Mar. 31, 2015 [publication date retrieve from Internet Wayback Machine on Oct. 8, 2019].

* cited by examiner

PUMP ADAPTER

CLAIM TO PRIORITY

This non-provisional patent application claims priority to and benefit of, under 35 U.S.C. § 119(e), U.S. Provisional Patent Application Ser. No. 62/727,716, filed Sep. 6, 2018 and titled "Pump Adapter", is expressly incorporated herein by reference.

CROSS REFERENCE TO RELATED APPLICATION

Cross-reference is made to U.S. Design patent application No. 29/662,532, filed Sep. 6, 2018 and titled "Pump Adapter", is expressly incorporated herein by reference.

BACKGROUND

1. Field of the Invention

Present embodiments relate to an adapter for a pump. More specifically, present embodiments relate to an adapter which allows for change of the connection type associated with a fuel pump to an alternate type connection.

2. Description of the Related Art

Traditional in-tank fuel pumps have a specific connection which sometimes utilizes a sock filter for pickup of fuel within the tank. However, certain automotive parts utilize an alternate type of port, for example an o-ring AN-port, and it would be desirable to utilize existing fuel pumps while being able to easily change the type of connection.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present embodiments provide an adapter which may be utilized with traditional in-tank fuel pumps to convert the pump from a first style to a second, alternative style. The instant embodiment utilizes an adapter which slides on the end of an existing fuel pump type and provides indexing for proper alignment and fuel communication. The adapter also additionally allows connection of alternate type of port or fitting in order to allow connection with more desirable type of fuel pickup system. The adapter is then clamped onto the end of the pump once the adapter and pump are indexed to proper alignment for sealing and fuel communication. The adapter may also include a coupling for a fitting to connect additional fuel delivery and/or filtration parts to the pump.

According to some embodiments, a pump adapter may comprise a housing having a first end, a second end and a substantially hollow interior, one of the first end and the second end being open and capable to receive a pump housing, the other of the first end and the second end being closed and having an opening formed therein which is capable of fluid communication with a fitting, the opening formed in a wall which closes the other of the first end and the second end, the open end being larger than the opening which communicated with the fitting, at least one indexing feature on an interior side of the wall and, a clamp disposed on an interior of the housing.

Optionally, according to some embodiments, the housing may further comprise a window. The pump adapter may further comprise a clamp adjustment extending from the window. The indexing feature may be capable of locating the pump in an orientation so that the opening capable of receiving a fitting is in fluid communication with the pump. The indexing feature may be male or may be female. The housing may be circular in cross section and the opening may be circular in cross section. The pump adapter may further comprise a fitting disposed in the opening. The pump adapter may further comprise a weep hole in the wall. The fitting may be fastened to the adapter or may be machined in the adapter.

According to some embodiments, a method of using a pump adapter may comprise the steps of inserting a pump into the pump adapter, rotating the adapter to an indexed position, advancing the pump into the adapter to a fully seated position, and making a fluid connection to the adapter for fuel transfer.

Optionally, the method may further comprise making a fluid connection with a fuel supply tank.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of an adapter will now be described by way of examples. These embodiments are not to limit the scope of the claims as other embodiments of an adapter will become apparent to one having ordinary skill in the art upon reading the instant description. Non-limiting examples of the present embodiments are shown in figures wherein:

DETAILED DESCRIPTION

Figure 1:
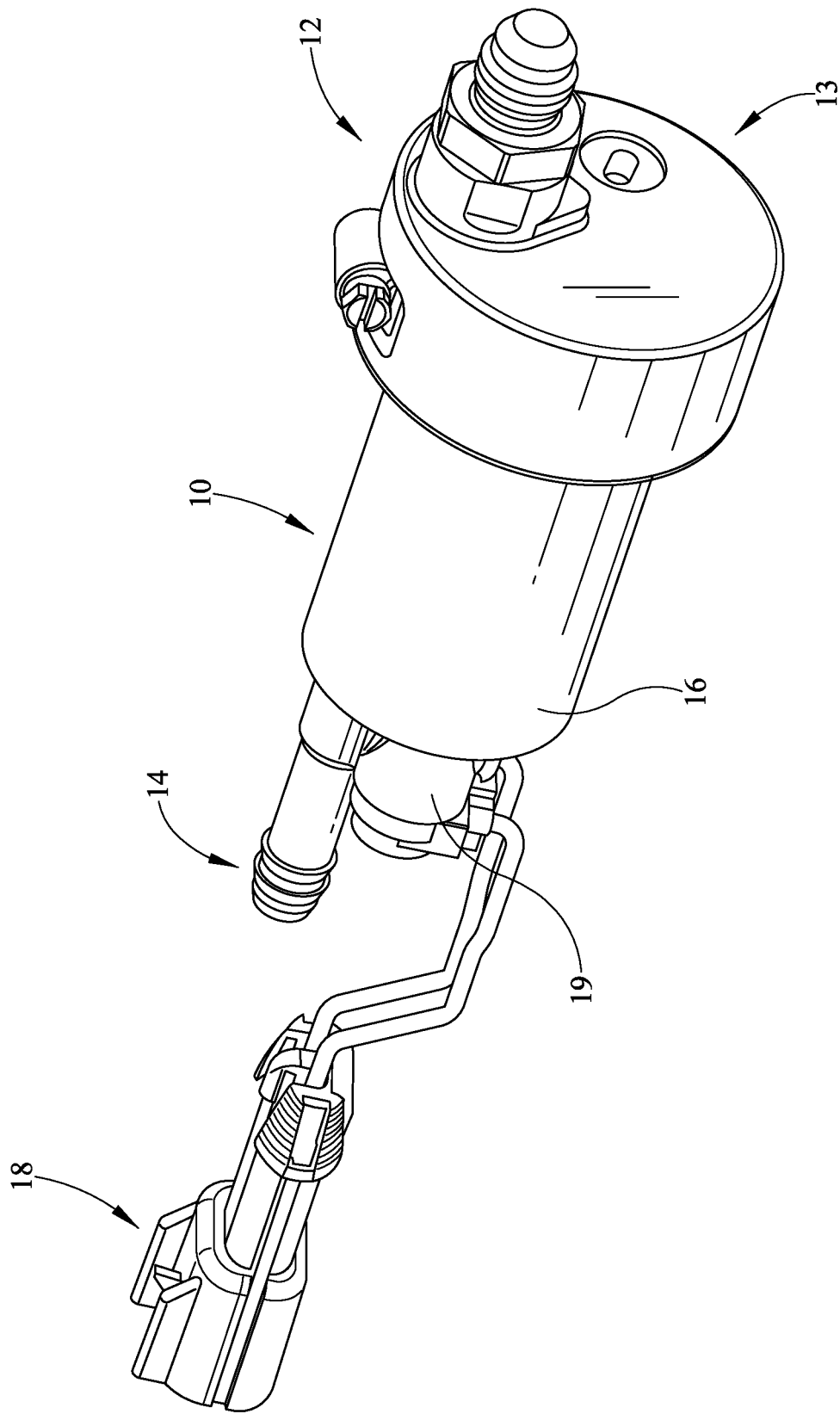
FIG. 1 is a perspective view of a pump with a pump adapter connected thereto.

It is to be understood that an adapter is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein is used broadly and encompass direct and indirect connections, couplings, and mountings. In addition, the terms "connected" and "coupled" and variations thereof are not restricted to physical or mechanical connections or couplings.

Referring now to FIGS. 1-12, pump adapters are provided which allow conversion of a pump fitting from a first type to a second type, which is desirable in order to add additional parts which may not be connectable to the original type of pump connection. The adapter is applied to a pump and indexed for proper alignment and sealing, fluid communication. The adapter also provides a coupling for connection of a fitting thereto to allow the additional connection of desirable type of pump filter and/or fuel pickup parts or accessories.

Referring now to FIG. 1, a perspective view of an assembly is provided, including a pump 10 and a pump adapter 12. The pump 10 includes an inlet end 13 which is where the adapter 12 is connected and outlet end 14 which is placed in fluid communication with the remainder of the fuel flow system of an automotive vehicle. The pump 10 may include a motor 19 disposed within a housing 16 and an electrical connector 18 which powers the motor 19 for the pump 10, or the pump 10 may be connected to a separately housed motor. At the inlet end 13 of the pump 10 the pump adapter 12 is positioned over the pump 10 to provide fluid communication therewith in a sealed manner. When the electrical connector 18 is connected and electrical power is provided to the pump 10, fuel may be pulled from the inlet end 13 through the pump 10 and toward the outlet end 14. It should be understood that the adapter 12 may be provided to change connection type of the outlet end 14.

Figure 2:
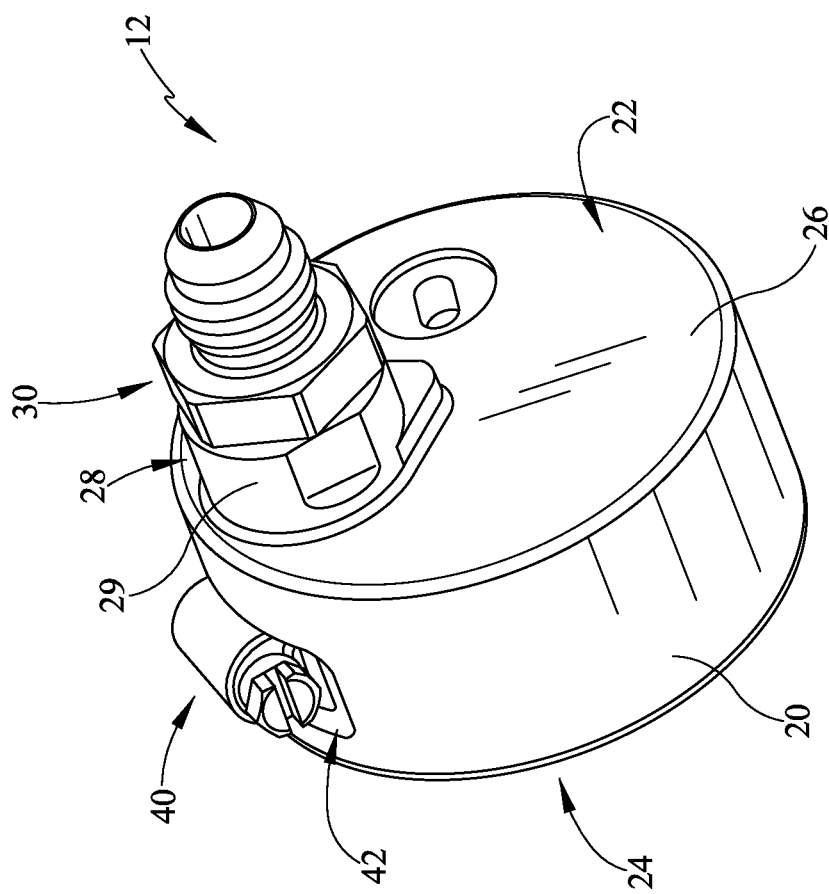
FIG. 2 is a first perspective view of the pump adapter of FIG. 1 with the pump removed.

Referring now to FIG. 2, a perspective view of the adapter 12 is provided with the pump 10 (FIG. 1) removed. In this lower end perspective view, the adapter 12 is shown having a housing 20 including a first end 22 and a second end 24. The housing 20 is generally circular in cross section, although other shapes may be utilized. The interior of the housing 20, shown more clearly in further views, is substantially hollow and therefore should approximate or at least be capable of receiving the pump 10. With the second end 24 being open, according to some embodiments, the first end 22 includes a wall 26 which closes the adapter 12. An opening or port 28 is located in the wall 26 and receives a fitting 30. The fitting 30 allows for connection to other products such as HYDROMAT, which is available from Holley Performance Products, LLC of Bowling Green, Ky. The opening 28 may be formed as a coupling 29 formed as part of the adapter 12 to receive the fitting 30. In other embodiments, the opening 28 may be formed integrally along with the fitting 30 or connected when the adapter is formed.

The adapter 12 further comprises a clamp 40. The housing 20 may include a window 42 through which a portion of the clamp 40 may extend to allow adjustment of the clamp.

Figure 3:
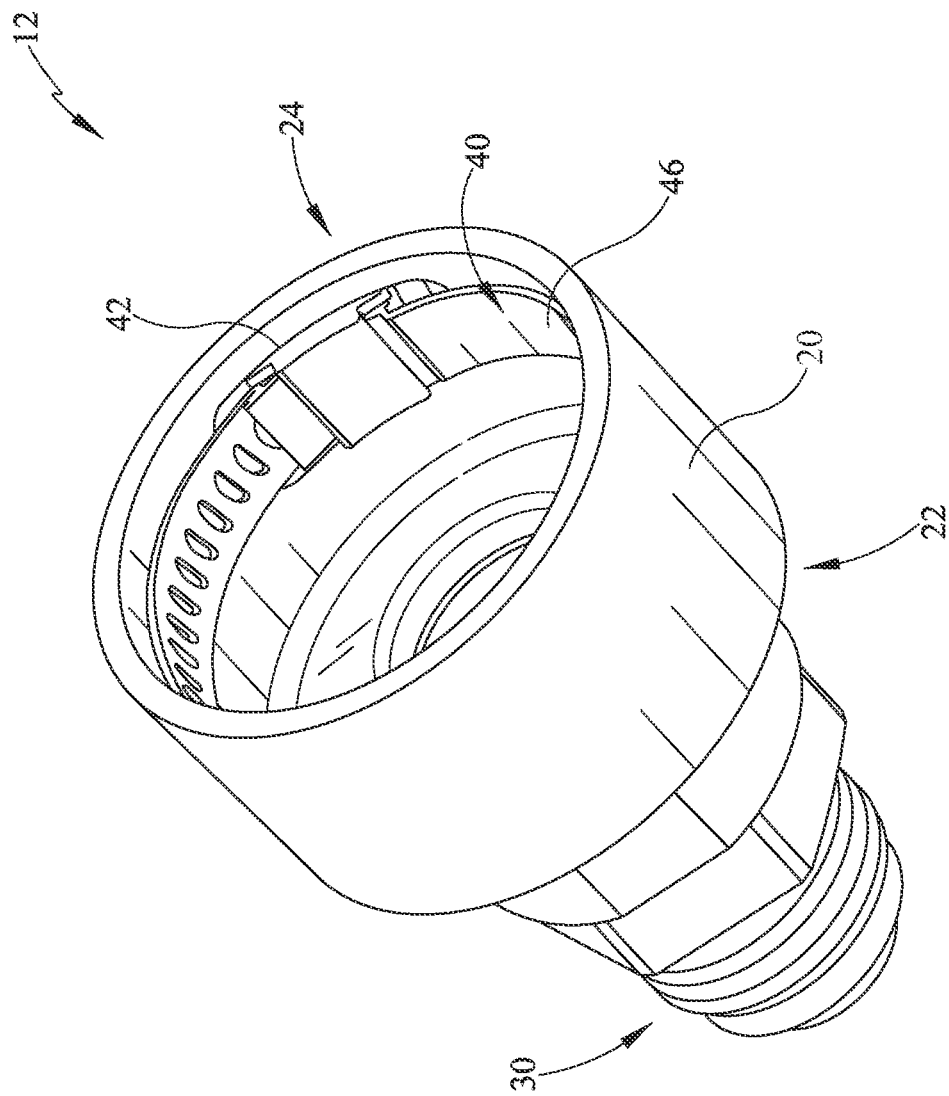
FIG. 3 is a second perspective view of the adapter of FIG. 2.

With reference now to FIG. 3, a second perspective view of the adapter 12 is provided. The view provided in FIG. 3 shows the second end of the adapter 12 which is, according to some embodiments, open and receives the pump 10 (FIG. 1). Along the inside surface of the housing 20, the clamp 40 is positioned and the window 42 is shown in the housing 20 allowing an adjustment portion of the clamp 40 to extend therethrough. The clamp 40 comprises a band 46 extending about the inner surface of the housing 20. Upon tightening of the clamp 40, the band 46 engages and tightens against a pump 10 located within the adapter 12.

Also shown in this view, the open end of the housing 20 is generally circular in shape. Again, however, other shapes may be utilized to approximate the exterior shape of the pump 10.

With reference to FIGS. 1-3, the opening 28 in the wall 26 may be of different sizes and at differing locations. For example, in the embodiment shown FIG. 1, the opening 28 is not centered. Alternatively, in the embodiment of FIG. 3, the opening 28 is shown in a more central location and of a larger size than the embodiments of FIGS. 1 and 2. This may be dependent on the size and location of the pump inlet.

Figure 4:
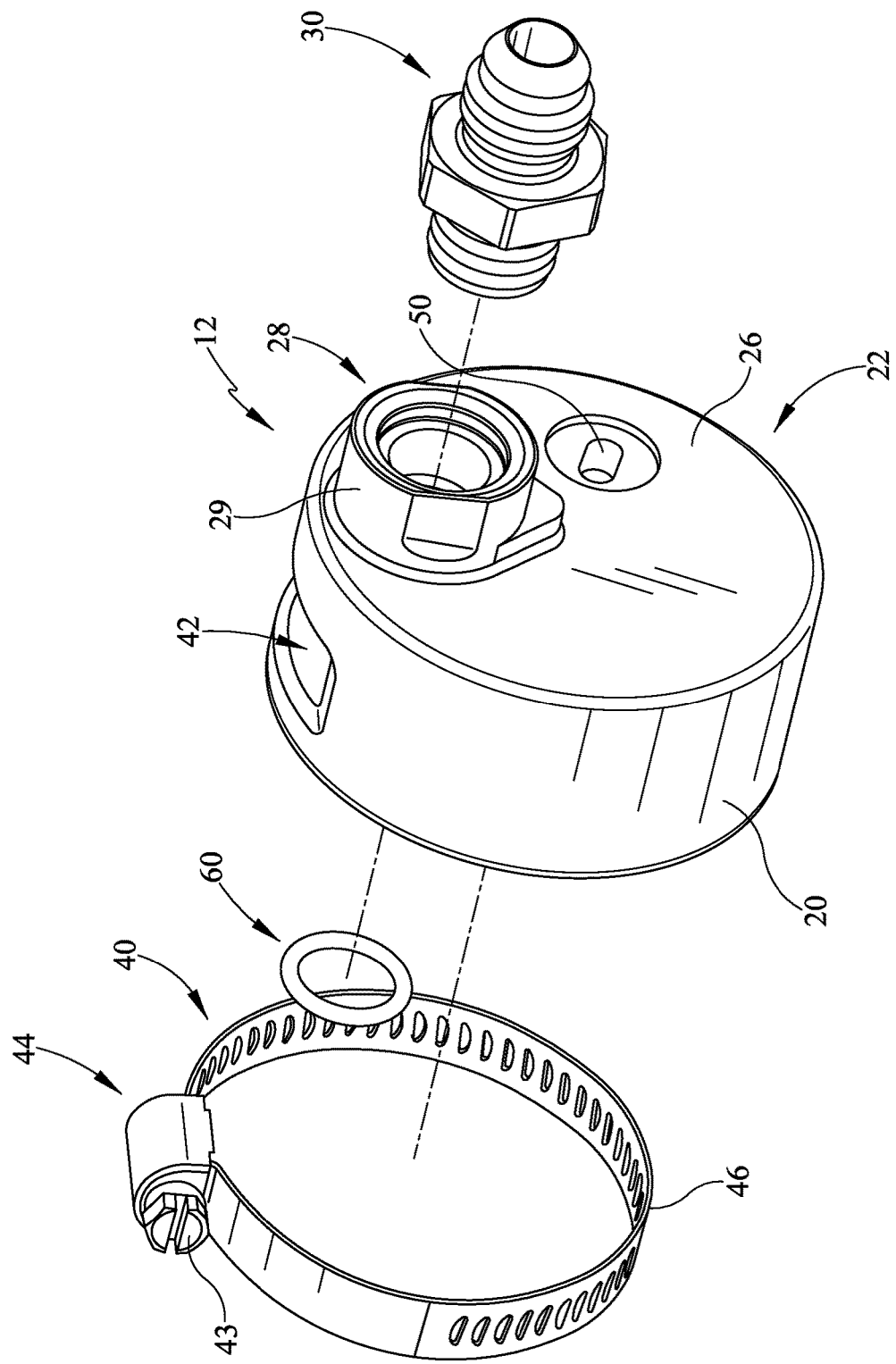
FIG. 4 is an exploded perspective view of the parts of the adapter and a fitting.

With reference now to FIG. 4, an exploded perspective view of the adapter 12 is depicted. The view comprises the housing 20 and the window 42 in the housing. With the clamp 40 partially extending through the window 42, this may aid to retain the adapter 12 on the pump 10 (FIG. 1). The first end 22 is also shown having the wall 26 and opening defining the coupling 29 which receives the fitting 30. The wall 26 may also comprise a weep hole 50 to allow pump drainage out of the adapter 12.

Also shown in the embodiment is the clamp 40 which comprises a band 46 and an adjustment mechanism 44 which may comprise a fastener 43 as depicted. When the fastener 43 is rotated, the band 46 may be tightened or loosened along the interior surface of the adapter 12. This will either tighten or loosen against the pump 10 (FIG. 1) allowing application or removal of the adapter 12 onto the pump 10 or release therefrom. Additionally, an o-ring 60 may be provided which fits within the coupling formed near the opening 28. The o-ring 60 provides a seal engagement between the adapter 12 and the pump 10 positioned within the adapter 12.

Figure 5:
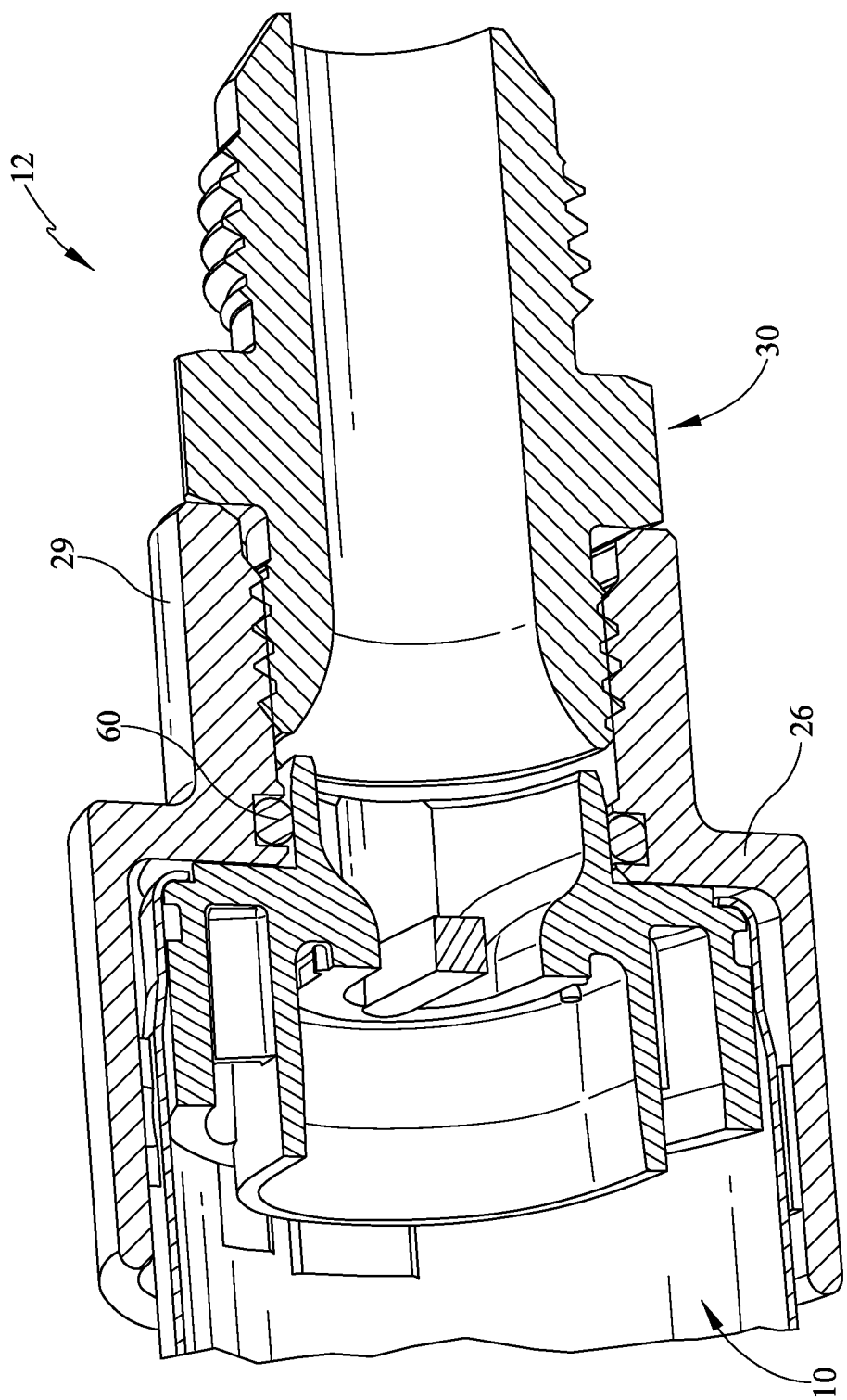
FIG. 5 is a section view of the pump and pump adapter connected together.

Referring now to FIG. 5, a cross-sectional view is provided showing the engagement between the pump 10 and the adapter 12. In this view, the o-ring 60 is shown engaging an inlet end 13 (FIG. 1) of the pump 10. The o-ring 60 is positioned in a retainer, such as a channel, adjacent to the fitting 30. The fitting 30 may be threadably connected to the adapter 12 within the coupling 29 formed on the wall 26. As shown, fuel enters through the fitting 30 and into the pump 10 before passing to the outlet end 14 (FIG. 1) of the pump 10.

Figure 6:
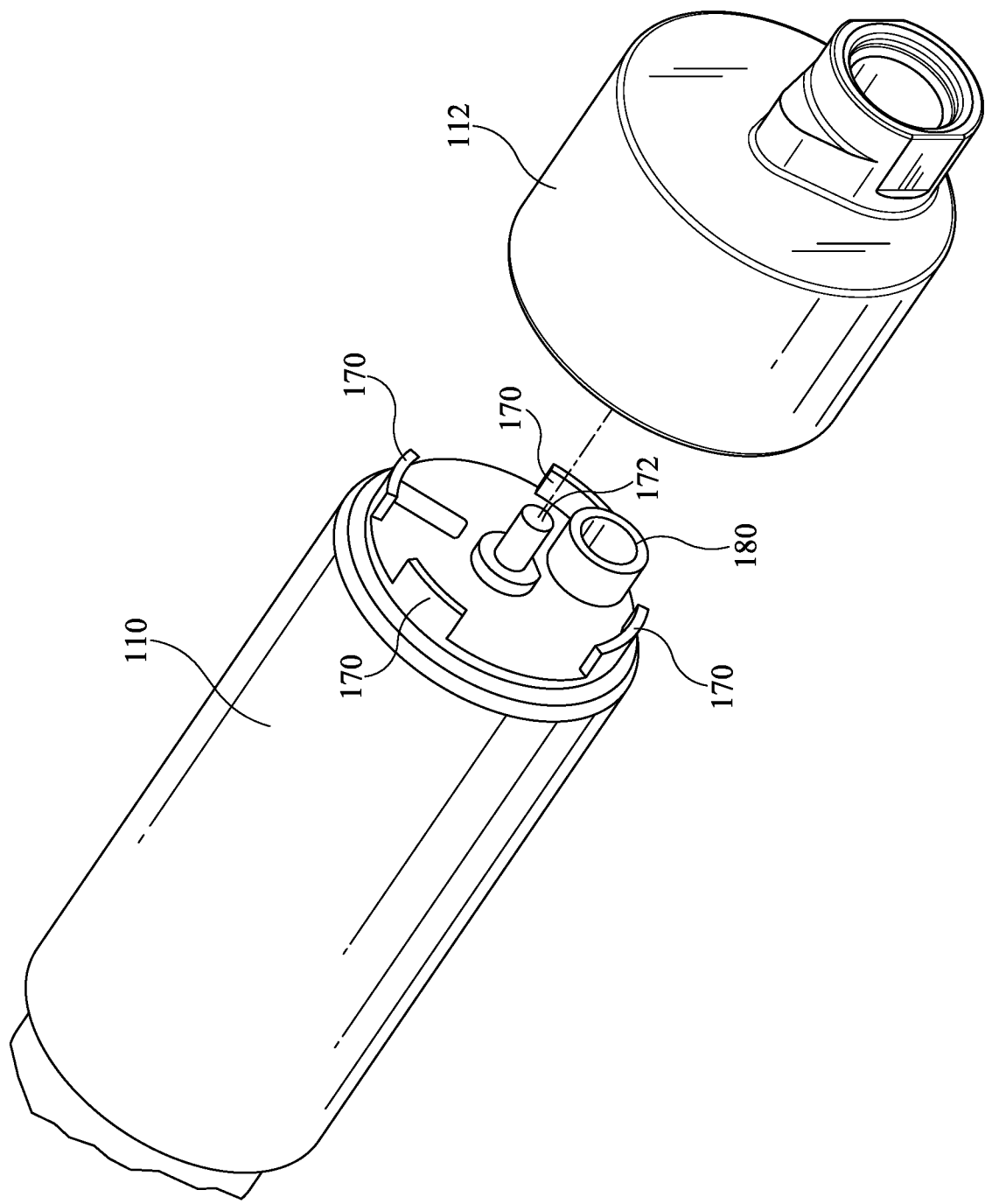
FIG. 6 is an exploded perspective view of the pump separated from the adapter.

Referring now to FIG. 6, an additional embodiment is provided wherein a plurality of indexing features 170 are provided. The indexing features align the pump 110 relative to the adapter 112, so that the pump 110 may make a fluid communication in a sealed manner when the device is in a proper alignment. In some embodiments, the pump and motor may be in a single housing as shown, while in others the pump and motor may be separate structures that are operably connected. The indexing features 170 extending from an end of the motor 110 and if not properly aligned with corresponding features of the adapter 112, the motor cannot be fully engaged with the adapter 112. If the pump 110 is not aligned properly, it may be rotated about its major axis until the indexing features 170 are aligned with features of the adapter 112. Upon such alignment, the pump 110 may be further inserted into the adapter 112 in a sealed arrangement.

Figure 7:
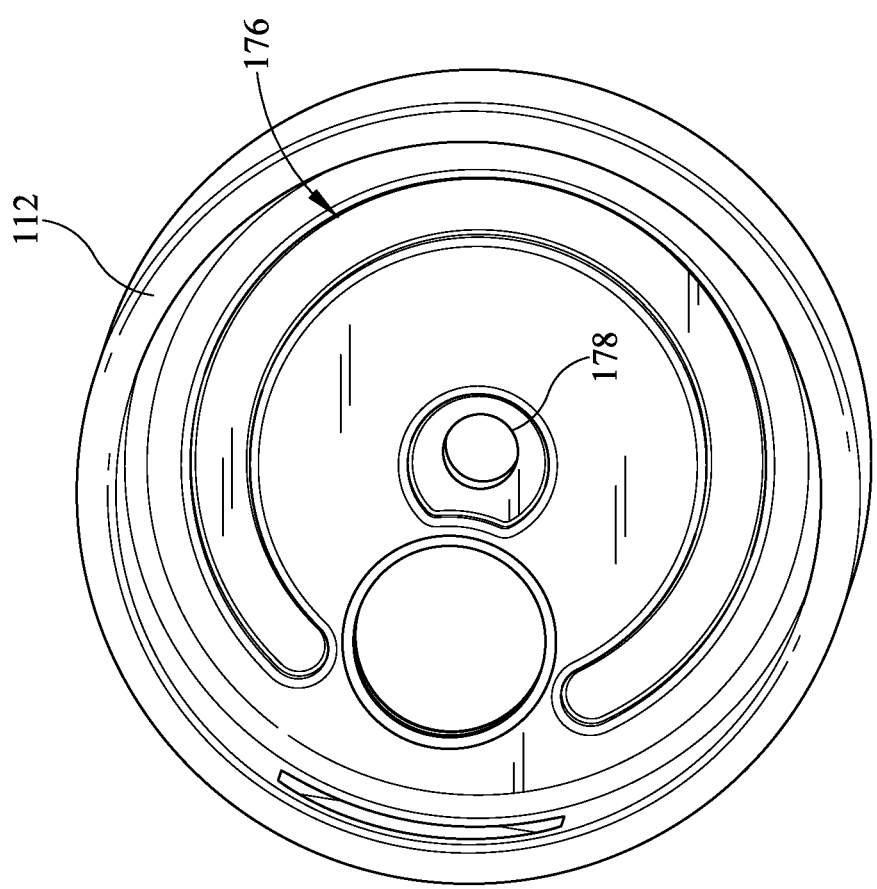
FIG. 7 is an internal view of an embodiment of an indexing arrangement.

Referring to FIG. 7, an internal view of an adapter 112 is shown. In this view, the indexing features 176 is shown as a partially circular shape corresponding to the arrangements of indexing features 170 (FIG. 6). If the pump indexing features 170 are not positioned correctly, they will not all be received in the adapter indexing feature 176. Also, feature 178 is provided to receive the feature 172 (FIG. 6).

With reference to both FIGS. 6 and 7, one skilled in the art will notice that one set of features is male and the other set is female. While the male features are shown on the pump 110 and the female are shown in the adapter 112, the arrangements may be reversed. Further, the features 170, 176 may be mixed as well, for example male and female features may be mixed on either or both of the pump 110 and adapter 112.

The pump inlet 180 is also shown and is provided to align with the coupling of the adapter 112.

Figure 8:
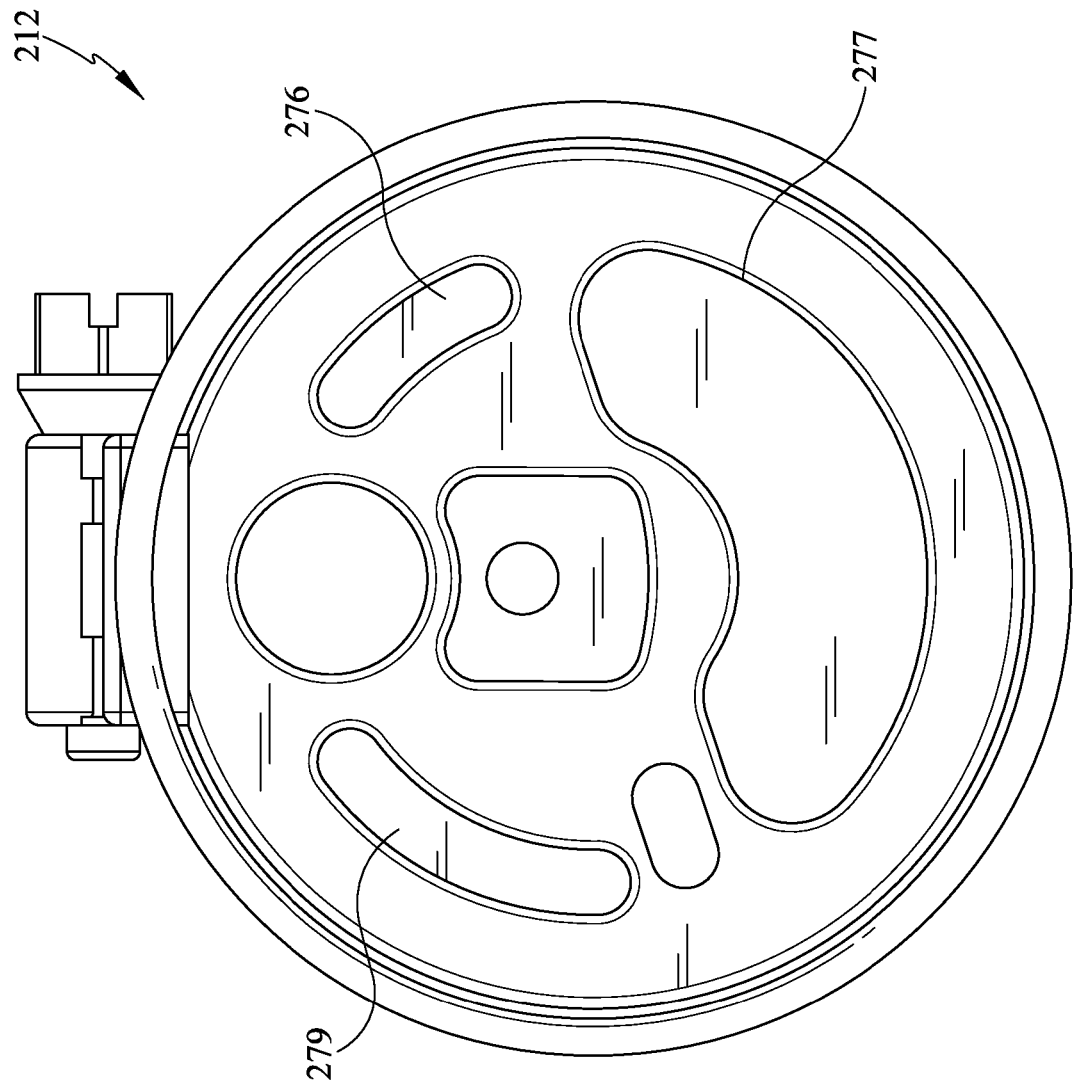
FIG. 8 is an internal view of an alternate embodiment of an indexing arrangement.

Referring now to FIG. 8, an internal view of an adapter 212 is provided. The indexing features 276, 277 and 279 are all provided having differing arcuate lengths. Whereas the embodiment of FIG. 7 provided a long arcuate female feature 176, the instant embodiment provides multiple features, each of which may be of differing length to provide proper alignment with the features of the pump.

In some alternate embodiments, pumps may be formed with keys or keyways and the adapter may also have corresponding keys/keyways. The indexing function may occur in an axial direction as the adapter is slidably disposed on the pump.

Figure 9:
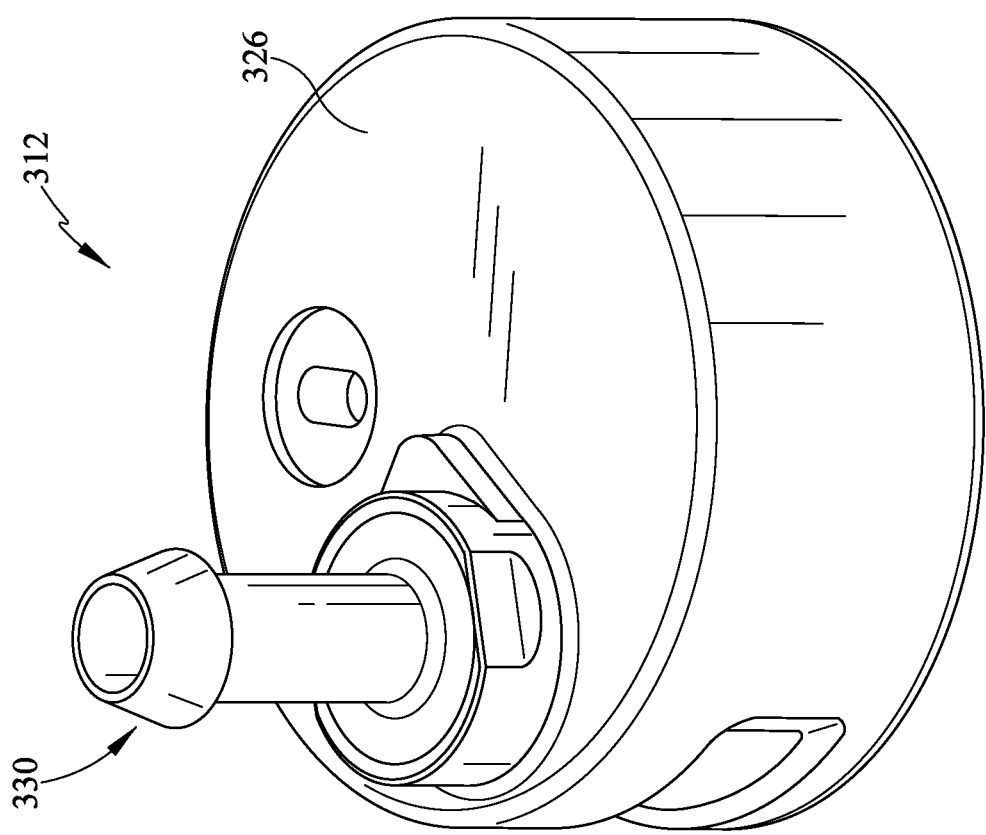
FIG. 9 is an alternate embodiment having a further connection type.
Figure 10:
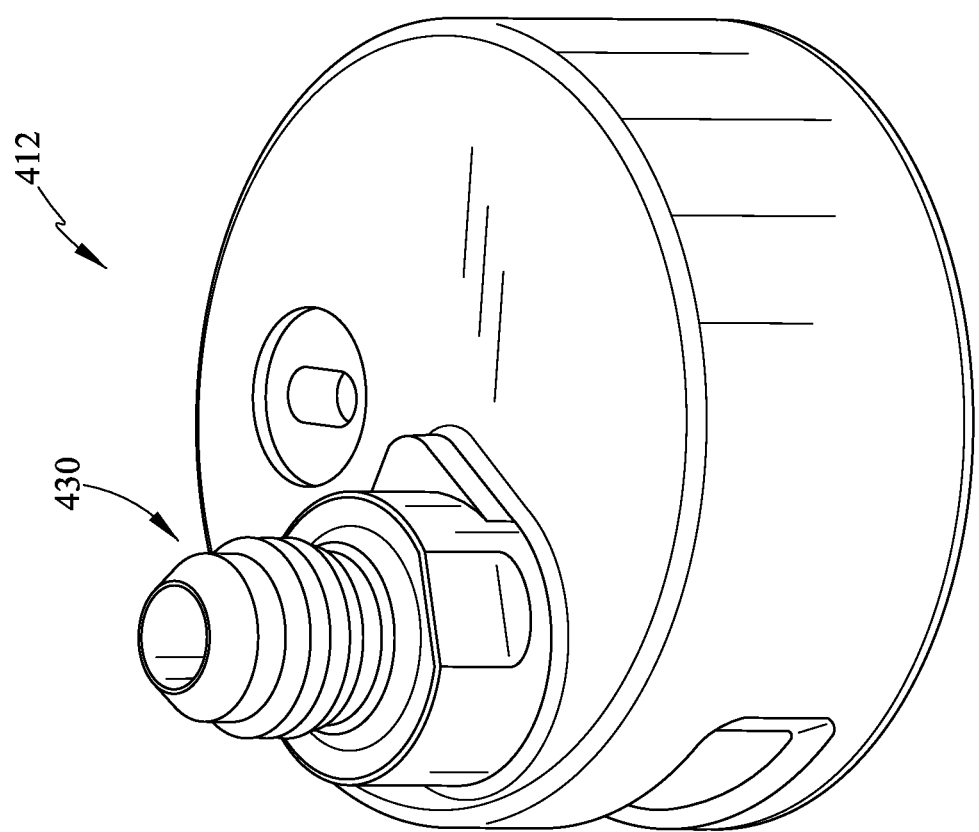
FIG. 10 is a second alternate embodiment having another connection type.

Referring now to FIGS. 9 and 10, further alternative views of the adapter according to some embodiments. It may be desirable to provide an adapter which provides for still further connection types. According to some embodiments, and with reference to FIG. 9, an adapter 312 is provided which utilizes a barb type connection. The adapter 312 is generally similar to the previous embodiments and such description is incorporated by reference herein. The device provides a male barb type connector 330 which may be pressed or pushed into the opening in the wall 326 or alternatively may be machined in the adapter.

With reference to FIG. 10, a further embodiment is provided wherein the coupling or port of the device has a male AN type of connector. The instant embodiment provides a machined AN type of connector 430 which is machined into the adapter 412.

One skilled in the art should understand that the adapters of the instant embodiments may allow for various connector types such as banjo, barb, male A N and others for non-limiting example. Those connectors may be screwed into place as shown in some views or alternatively may be machined in place. Other manufacturing embodiments may also be utilized.

Figure 11:
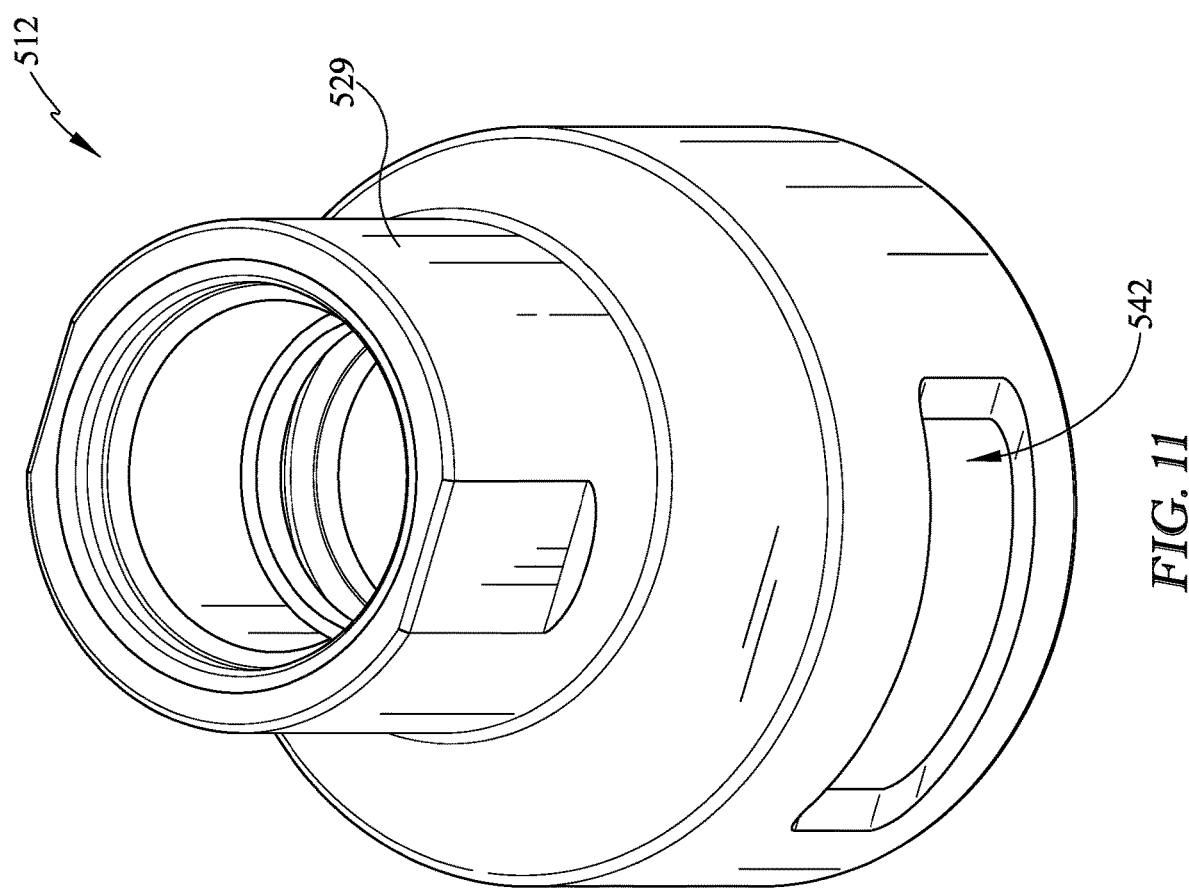
FIG. 11 is a further embodiment of an adapter.
Figure 12:
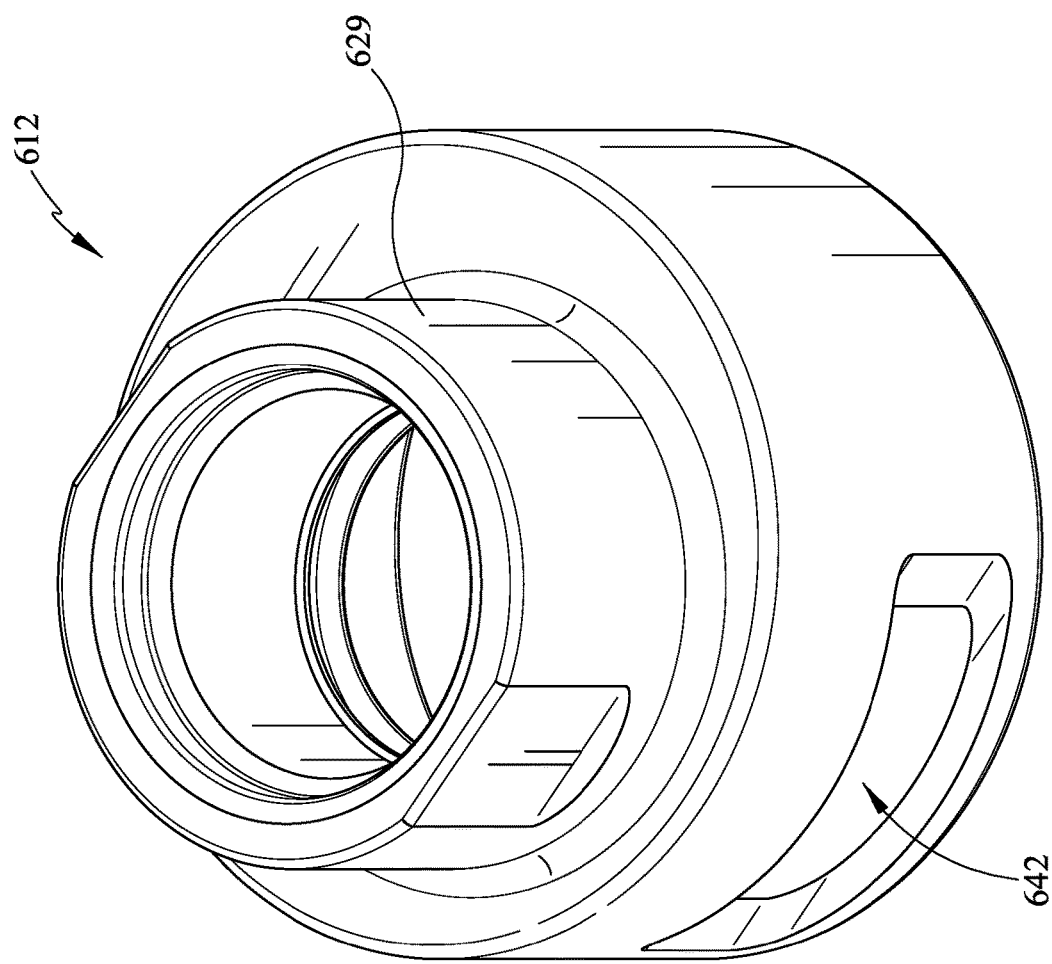
FIG. 12 is a further embodiment of an adapter.

Referring now to FIGS. 11 and 12, two embodiments are provided which show alternate configurations of the adapters 512, 612. In one embodiment, the opening for a fitting is provided of a larger size to indicate that fittings of various sizes may be utilized. Further therefore, the adapters may be formed to receive the fittings of differing sizes.

Additionally, the adapters may be formed and locate the coupling and opening in differing locations of the wall of the adapter. For example, in the instant embodiment, the adapter 512 provides the coupling 529 is spaced further from the window 542 of the adapter. However, in FIG. 12, the coupling 629 is disposed closer to the window 642 of the adapter. Additionally, the couplings and the openings may be of differing sizes from adapter to adapter, to receive fittings of differing sizes. Or, in further embodiments, the fitting may be formed integrally with the adapter or the adapter may be formed to receive the fitting.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A pump adapter, comprising:
   a housing having a first end, a second end, and a substantially hollow interior;
   said housing having a circumferential wall and an end wall, wherein one of said first end or said second end is an open end and receives an inlet end of a pump housing;
   a window formed in said circumferential wall of said housing;
   a clamp positioned within said housing and having a portion of said clamp extending through said window for adjustment of said clamp, said clamp engaging said pump housing;
   the other of said first end or said second end being closed by said end wall and having an opening formed in said end wall, said opening being capable of fluid communication with a coupling;
   said coupling disposed at an off-center location of an exterior surface of said end wall, said coupling having a cylindrically shaped interior capable of receiving a fitting;
   a groove disposed within said interior of said coupling and adjacent to said end wall;
   a seal disposed within said groove, said seal engaging an outer diameter of an inlet flange of a pump disposed within said pump housing, said inlet flange extending through said opening formed in said end wall and toward said coupling;
   said opening formed in the end wall being in fluid communication with said coupling;
   said open end being larger than said opening which communicates with said coupling; and,
   at least one indexing feature disposed on and formed with an interior surface of said end wall and spaced from said circumferential wall.

2. The pump adapter of claim 1, said at least one indexing feature capable of locating said pump housing in an orientation so that said opening, said coupling, and said fitting are in fluid communication with said pump of said pump housing.

3. The pump adapter of claim 2 wherein said at least one indexing feature is male.

4. The pump adapter of claim 2 wherein said at least one indexing feature is female.

5. The pump adapter of claim 1, wherein said housing is circular in cross section.

6. The pump adapter of claim 5, wherein said opening is circular in cross section.

7. The pump adapter of claim 1 further comprising said fitting disposed in said opening.

8. The pump adapter of claim 1 further comprising a weep hole in said end wall.

9. The pump adapter of claim 1 wherein said fitting is fastened to said coupling of said housing.

10. The pump adapter of claim 1 wherein said fitting is machined in said housing.

11. A method of using a pump adapter, comprising the steps of:
    inserting a pump into the pump adapter, said pump adapter having a circumferential wall extending from a closed end wall defining a housing;
    rotating the pump adapter to an indexed position defined by an indexing feature disposed on and formed with an inner surface of, and within a periphery of said closed end wall, and spaced from said circumferential wall;

advancing the pump into the pump adapter to a fully seated position, wherein a pump inlet flange extends into a coupling of said pump adapter, said coupling comprising a groove with a seal therein to engage said pump inlet flange;

clamping the pump adapter to the pump; and, making a fluid connection to the pump adapter for fuel transfer via said coupling disposed at an off-center location on an exterior surface of said closed end wall.

12. The method of claim 11, further comprising making a fluid connection with a fuel supply tank.

* * * * *